(12) United States Patent
Pandey et al.

(10) Patent No.: US 10,667,194 B2
(45) Date of Patent: May 26, 2020

(54) THRESHOLD-BASED SYSTEM INFORMATION ON DEMAND

(71) Applicant: QUALCOMM Incorporated, San Diego, CA (US)

(72) Inventors: Dhananjay Kumar Pandey, Gopalganj (IN); Ankit Mittal, Hyderabad (IN); Anil Kumar Devpura, Hyderabad (IN); Tapas Ranjan Das, Hyderabad (IN); Ashok Kumar Tripathi, Pragathi Enclave (IN); Guruvardhan Routhu, Hyderabad (IN); Sudeepta Kumar Nath, Sambalpur (IN); Krusna Prasad Jena, Hyderabad (IN)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/140,121

(22) Filed: Sep. 24, 2018

(65) Prior Publication Data

US 2020/0100160 A1    Mar. 26, 2020

(51) Int. Cl.
| | |
|---|---|
| *H04B 7/00* | (2006.01) |
| *H04W 36/30* | (2009.01) |
| *H04W 74/08* | (2009.01) |
| *H04W 36/08* | (2009.01) |
| *H04B 17/309* | (2015.01) |
| *H04W 36/00* | (2009.01) |

(Continued)

(52) U.S. Cl.
CPC .......... *H04W 36/30* (2013.01); *H04B 17/309* (2015.01); *H04W 36/0085* (2018.08); *H04W 36/08* (2013.01); *H04W 74/0833* (2013.01); *H04B 7/0413* (2013.01); *H04W 24/10* (2013.01)

(58) Field of Classification Search
CPC . H04W 74/002; H04W 74/008; H04W 74/04; H04W 76/02
USPC .......................... 370/310, 328, 329, 331, 332
See application file for complete search history.

(56) References Cited

U.S. PATENT DOCUMENTS

| | | | |
|---|---|---|---|
| 8,605,668 B2* | 12/2013 | Kubota | H04W 36/0061 370/329 |
| 8,942,205 B2* | 1/2015 | MacH | H04W 48/20 370/252 |
| 9,338,684 B2* | 5/2016 | Zhi | H04W 24/10 |

(Continued)

FOREIGN PATENT DOCUMENTS

| | | |
|---|---|---|
| CN | 107439023 A | 12/2017 |
| WO | 2011024054 A1 | 3/2011 |

(Continued)

OTHER PUBLICATIONS

International Search Report and Written Opinion—PCT/US2019/052628—ISA/EPO—dated Dec. 10, 2019.

*Primary Examiner* — Dmitry Levitan
(74) *Attorney, Agent, or Firm* — Harrity & Harrity, LLP

(57) ABSTRACT

Various aspects of the present disclosure generally relate to wireless communication. In some aspects, a user equipment may transmit a request for system information based at least in part on a threshold; and receive the system information based at least in part on the request. A base station may receive a request for system information, wherein the request is based at least in part on a threshold; and transmit the system information to a user equipment (UE) associated with the request based at least in part on the request. Numerous other aspects are provided.

30 Claims, 5 Drawing Sheets

(51) Int. Cl.
*H04W 24/10* (2009.01)
*H04B 7/0413* (2017.01)

(56) References Cited

U.S. PATENT DOCUMENTS

| | | |
|---|---|---|
| 2016/0234759 A1 | 8/2016 | Kubota et al. |
| 2018/0288748 A1* | 10/2018 | Horn ................... H04W 48/12 |
| 2019/0069220 A1* | 2/2019 | Kim .................... H04L 27/2613 |
| 2019/0261421 A1 | 8/2019 | Peisa et al. |
| 2019/0268964 A1* | 8/2019 | Lee ...................... H04W 88/04 |

FOREIGN PATENT DOCUMENTS

| | | |
|---|---|---|
| WO | 2018028670 A1 | 2/2018 |
| WO | 2018128575 A1 | 7/2018 |

* cited by examiner

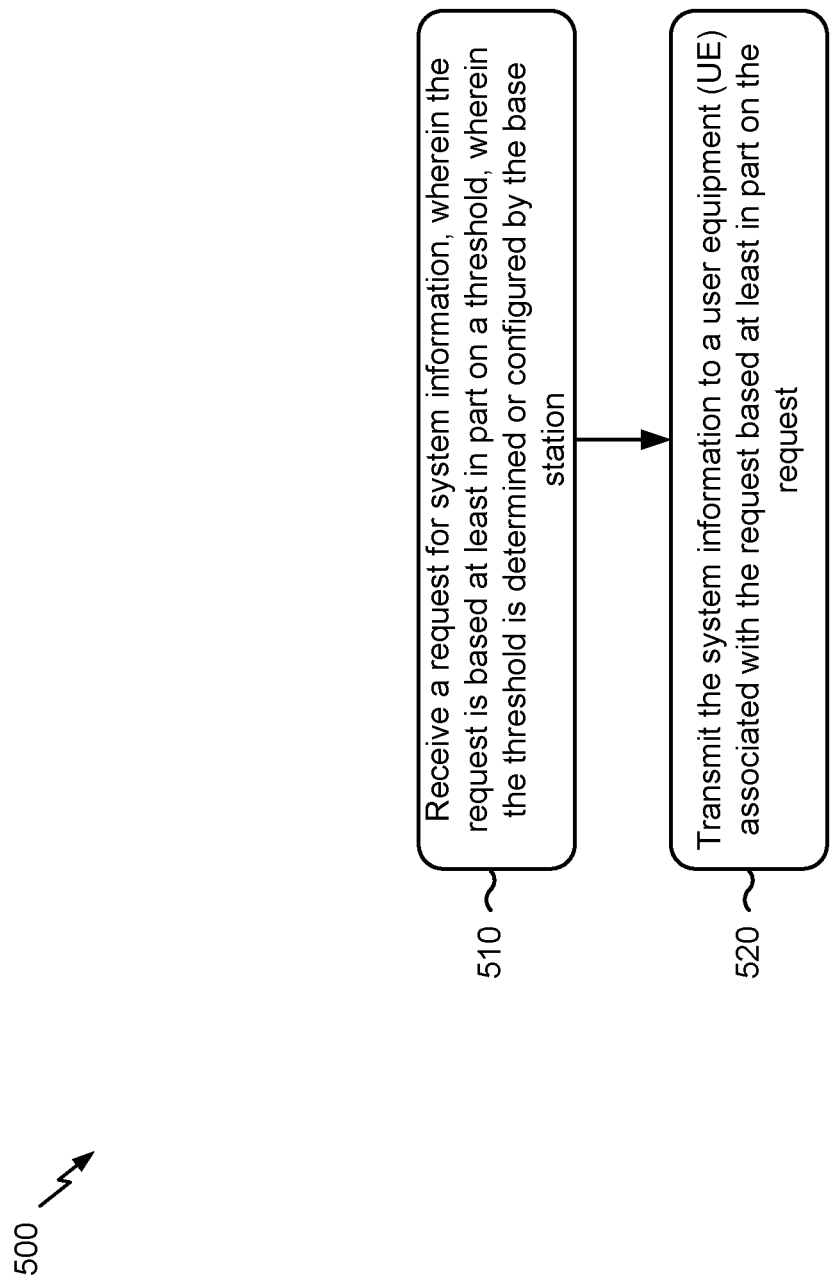

THRESHOLD-BASED SYSTEM INFORMATION ON DEMAND

FIELD OF THE DISCLOSURE

Aspects of the present disclosure generally relate to wireless communication, and more particularly to techniques and apparatuses for threshold-based system information on demand.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting a request for system information based at least in part on a threshold; and receiving the system information based at least in part on the request.

In some aspects, a user equipment for wireless communication may include memory and one or more processors operatively coupled to the memory. The memory and the one or more processors may be configured to transmit a request for system information based at least in part on a threshold; and receive the system information based at least in part on the request.

In some aspects, a non-transitory computer-readable medium may store one or more instructions for wireless communication. The one or more instructions, when executed by one or more processors of a user equipment, may cause the one or more processors to transmit a request for system information based at least in part on a threshold; and receive the system information based at least in part on the request.

In some aspects, an apparatus for wireless communication may include means for transmitting a request for system information based at least in part on a threshold; and means for receiving the system information based at least in part on the request.

In some aspects, a method of wireless communication, performed by a base station, may include receiving a request for system information, wherein the request is based at least in part on a threshold; and transmitting the system information to a user equipment (UE) associated with the request based at least in part on the request.

In some aspects, a base station for wireless communication may include memory and one or more processors operatively coupled to the memory. The memory and the one or more processors may be configured to receive a request for system information, wherein the request is based at least in part on a threshold; and transmit the system information to a user equipment (UE) associated with the request based at least in part on the request.

In some aspects, a non-transitory computer-readable medium may store one or more instructions for wireless communication. The one or more instructions, when executed by one or more processors of a base station, may cause the one or more processors to receive a request for system information, wherein the request is based at least in part on a threshold; and transmit the system information to a user equipment (UE) associated with the request based at least in part on the request.

In some aspects, an apparatus for wireless communication may include means for receiving a request for system information, wherein the request is based at least in part on a threshold; and means for transmitting the system information to a user equipment (UE) associated with the request based at least in part on the request.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example process performed, for example, by a base station, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
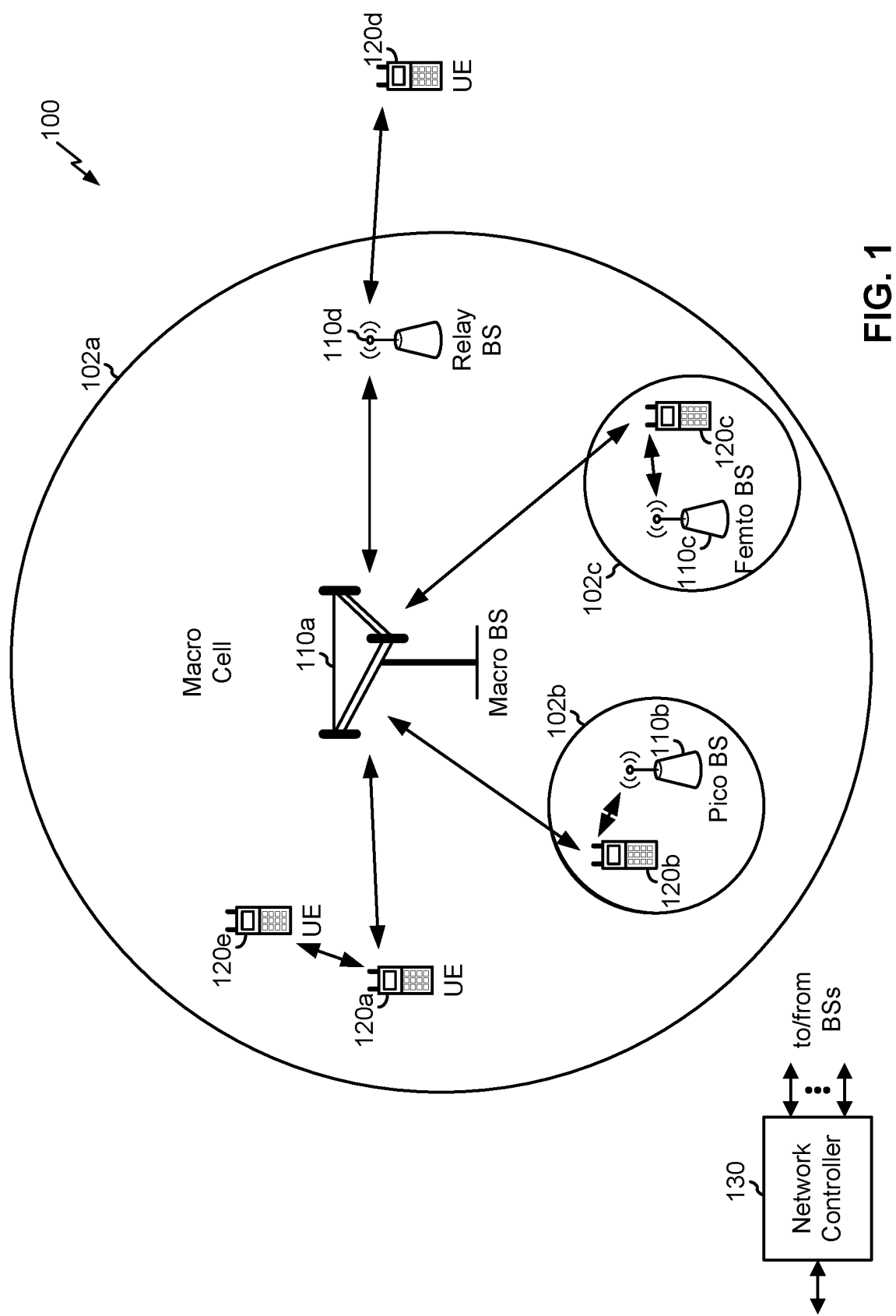
FIG. 1 is a block diagram conceptually illustrating an example of a wireless communication network, in accordance with various aspects of the present disclosure.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
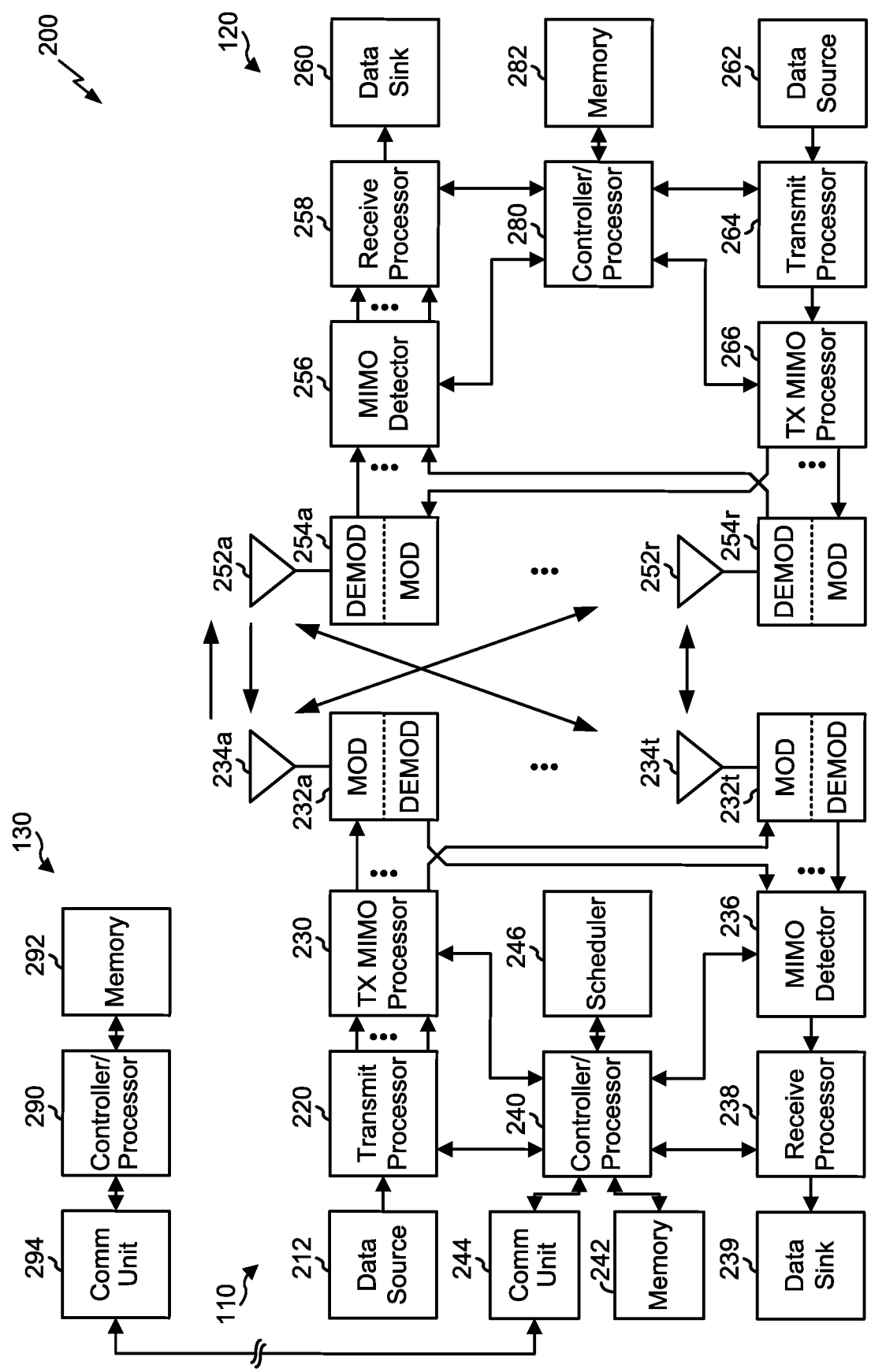
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with threshold-based system information on demand, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for transmitting a request for system information based at least in part on a threshold; means for receiving the system information based at least in part on the request; means for receiving information identifying the threshold; means for determining the threshold; means for determining that the threshold is satisfied; and/or the like. In some aspects, such means may include one or more components of UE 120 described in connection with FIG. 2.

In some aspects, base station 110 may include means for receiving a request for system information, wherein the request is based at least in part on a threshold; means for transmitting, broadcasting, or unicasting the system information to a user equipment (UE) associated with the request based at least in part on the request; means for transmitting, broadcasting, or unicasting information identifying the threshold; means for determining the threshold; and/or the like. In some aspects, such means may include one or more components of base station 110 described in connection with FIG. 2.

As indicated above, FIG. 2 is provided merely as an example. Other examples are possible and may differ from what was described with regard to FIG. 2.

In 5G/NR, system information may be provided on demand. For example, a BS (e.g., BS 110) may provide some system information (e.g., a system information block (SIB) other than system information block 1 (SIB1)) based at least in part on receiving a request for the system information from a UE (e.g., UE 120). In some aspects, the system information may include system information for cell reselection (e.g., SIB2, SIB3, SIB4, etc.), although the techniques and apparatuses described herein are not limited to those involving system information for cell reselection. By providing the system information based at least in part on the request, network resources are conserved that would otherwise be used for provision of the other system information as a matter of course.

However, in some scenarios, the UE may request system information when the system information is not needed. For example, system information for cell reselection may not be necessary when the UE is located near the center of a BS's coverage (e.g., since the UE is not likely to perform cell reselection in such a case). As another example, in the case where the UE is to reselect from a serving cell to a target cell, the UE may request the system information for cell reselection from the serving cell and the target cell. Requesting this system information from the target cell may be unnecessary, since the UE is unlikely to quickly reselect to another cell other than the target cell.

Some techniques and apparatuses described herein provide for the selective requesting of system information, such as system information for cell reselection (e.g., SIB2, SIB3, SIB4, etc.) or other types of system information. For example, a UE may request system information based at least in part on a threshold relating to a measurement performed by the UE. In some aspects, the UE may request the system information based at least in part on a reporting event, as described in more detail below. The threshold may be determined by the UE, configured by a BS, preconfigured for the UE, and/or the like. In this way, the requesting of system information for cell reselection may be reduced when near the center of the cell, since the threshold is likely to be satisfied in such a case. Thus, network resources are conserved. Furthermore, the likelihood of the UE requesting system information from a target cell is reduced since the target cell is likely to satisfy the threshold. Thus, network resources of the target cell are conserved.

Figure 3:
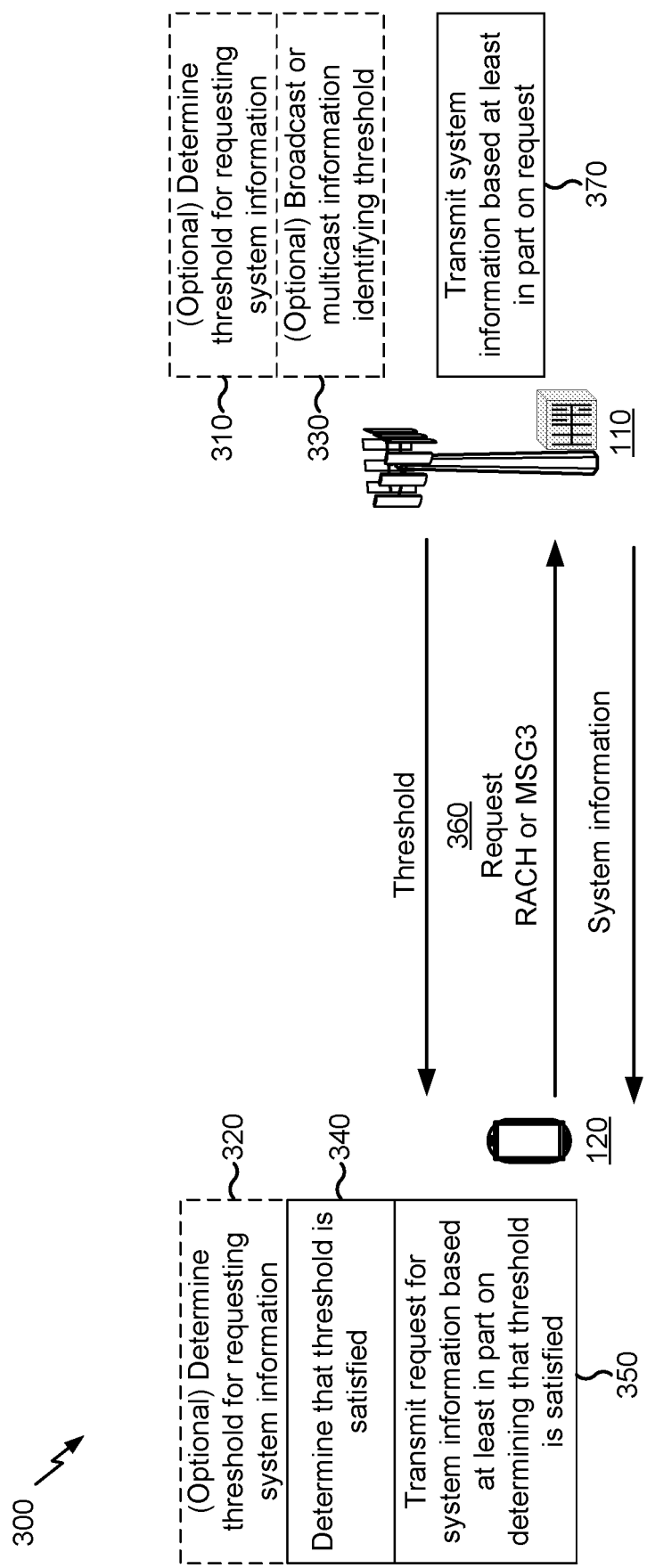
FIG. 3 is a diagram illustrating an example of threshold-based system information on demand, in accordance with various aspects of the present disclosure.

FIG. 3 is a diagram illustrating an example 300 of threshold-based system information on demand, in accordance with various aspects of the present disclosure.

As shown in FIG. 3, and by reference number 310, a BS 110 may optionally determine a threshold for requesting system information. For example, the threshold may relate to a measurement or measurement value (e.g., a reference signal received power (RSRP) value, a reference signal received quality (RSRQ) value, a signal to interference plus noise (SINR) value, etc.). In some aspects, the BS 110 may determine multiple, different thresholds, as described in more detail below.

In some aspects, the threshold may relate to a reporting event. A reporting event may be referred to in some cases as a measurement report trigger, a measurement event, and/or the like. For example, the threshold may be based at least in part on a serving cell or primary cell of the UE 120, such as when the serving cell or primary cell is better than the threshold (e.g., an A1 event) or worse than the threshold (e.g., an A2 event), when a neighbor or target cell becomes better than the serving cell or primary cell by the threshold value (e.g., an A3 event), when the neighbor or target cell is better than the threshold (e.g., an A4 event), when the serving cell or primary cell becomes worse than a first threshold and the neighbor or target cell becomes better than a second threshold (e.g., an A5 event), or another reporting event (e.g., A6, C1, C2, B1, B2, W1, W2, W3, V1, V2, and/or the like). In some aspects, the threshold may be based at least in part on a combination of two or more of the above reporting events.

In some aspects, the BS 110 may determine the threshold based at least in part on another threshold. For example, the BS 110 may select a value that is offset from another threshold for the UE 120. As an example, the BS 110 may use a first threshold (e.g., −100 dB) for reselection by the UE 120, and may use a second threshold (e.g., −90 dB) for requesting the system information. In this way, the UE 120 may request system information (e.g., system information for cell reselection) when cell reselection is imminent. This may conserve network resources that would otherwise be used to request the system information when the cell reselection is not imminent (e.g., unnecessarily As shown by reference number 320, in some aspects, the UE 120 may determine the threshold for requesting system information. For example, the UE 120 may determine the threshold based at least in part on a preconfigured value, based at least in part on a condition or parameter of the UE 120, and/or the like. In some aspects, the UE 120 may determine the threshold based at least in part on a mobility state of the UE 120. For example, the UE 120 may determine a value of the threshold based at least in part on whether the UE 120 is stationary and/or based at least in part on a movement speed of the UE 120. In this way, the UE 120 may determine the threshold based at least in part on a mobility state of the UE 120, which may be related to a likelihood that the UE 120 will perform reselection. Thus, the UE 120 may more efficiently request system information (e.g., for reselection) when the UE 120 is likely to perform reselection based at least in part on the mobility state.

As shown by reference number 330, in some aspects, the BS 110 may transmit (e.g., unicast, multicast, broadcast, etc.) information identifying the threshold. In some aspects, the BS 110 may transmit the information identifying the threshold as downlink control information, radio resource control information, system information, and/or the like.

In some aspects, the BS 110 may transmit information identifying multiple, different thresholds. For example, the BS 110 may provide information identifying thresholds for multiple UEs 120, thresholds for different type of system information, and/or the like. In some aspects, the BS 110 may determine the multiple, different thresholds. In some aspects, in the case when the UE 120 is to determine the threshold, the UE 120 may determine the multiple, different thresholds (e.g., for different types of system information, for different mobility states, etc.).

As shown by reference number 340, the UE 120 may determine that the threshold is satisfied. For example, the UE 120 may determine that the threshold is satisfied based at least in part on a measurement performed by the UE 120. In some aspects, the measurement may include an RSRP measurement, an RSRQ measurement, a SINR measurement, and/or the like. In some aspects, the UE 120 may determine that the threshold is satisfied based at least in part on a reporting event, such as one or more of the reporting events described above. In some aspects, the UE 120 may determine that the threshold is satisfied with regard to a particular type of system information (e.g., a particular SIB, a particular set of SIBs, one or more SIBs for cell reselection, and/or the like).

As shown by reference number 350, the UE 120 may transmit a request for system information based at least in part on determining that the threshold is satisfied. For example, a radio resource control (RRC) layer of the UE 120 may provide a system information request indication to a media access control (MAC) layer of the UE 120. The MAC layer may cause the UE 120 to transmit the request. As shown by reference number 360, the request may include a random access message, a RRC connection request message, and/or the like. For example, the request may be a random access message (e.g., a random access channel (RACH), a MSG3 message (e.g., a connection request message, a radio resource control connection request message, etc.), or another type of message.

In some aspects, the request may indicate the system information that is to be transmitted. For example, the request may include or be associated with an indication of the system information (e.g., a preamble of the request, a payload of the request, etc.). In some aspects, the resource used to transmit the request may indicate the system information. For example, different resources may be associated with different system information. The UE 120 may identify a resource that is associated with system information to be requested (e.g., system information for cell reselection and/or the like), and may transmit the request using the resource that is associated with the system information to be requested.

As shown by reference number 370, the BS 110 may transmit the system information based at least in part on the request. In some aspects, the BS 110 may unicast, multicast, or broadcast the system information to the UE 120. In some aspects, the BS 110 may transmit particular system information, such as system information identified by the request. In some aspects, the BS 110 may transmit system information for cell reselection. In this way, the UE 120 may request, and the BS 110 may provide, system information based at least in part on a threshold.

As indicated above, FIG. 3 is provided as an example. Other examples are possible and may differ from what was described with respect to FIG. 3.

Figure 4:
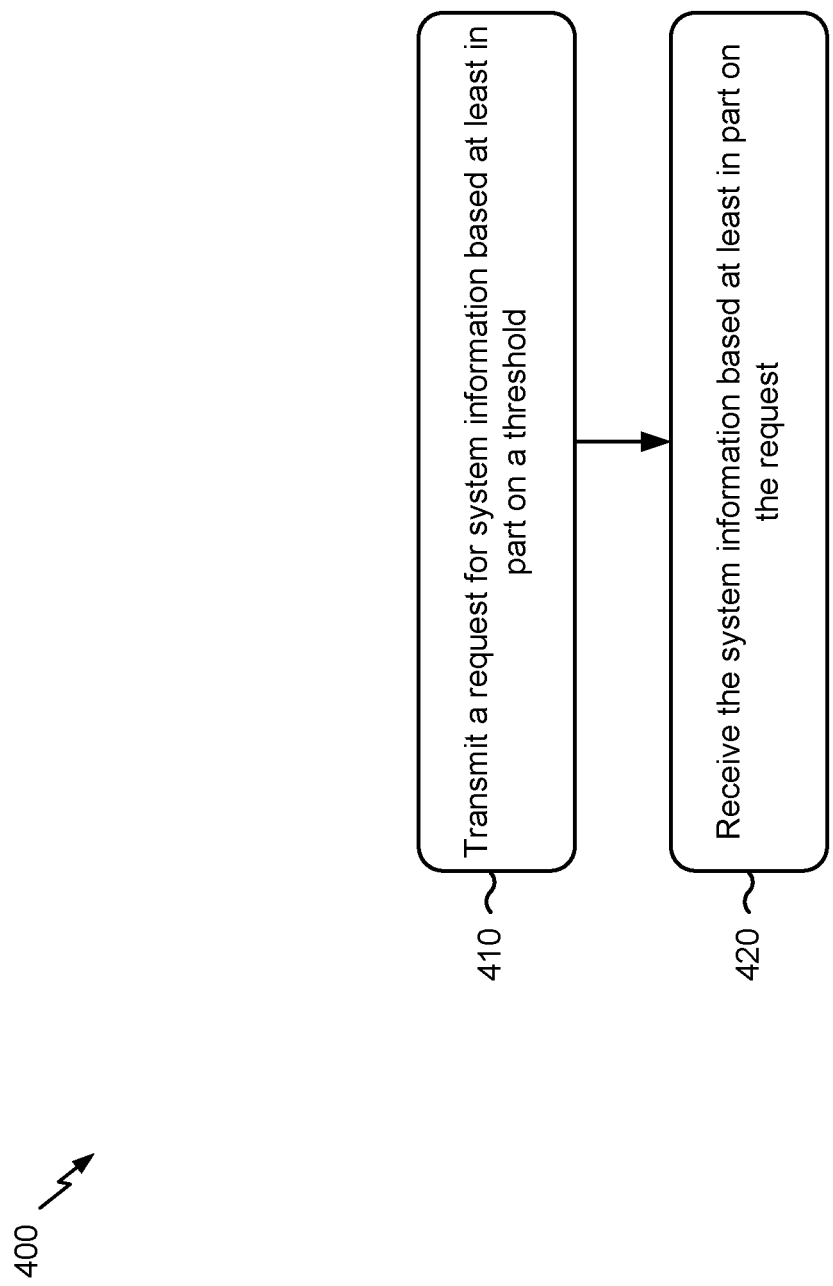
FIG. 4 is a diagram illustrating an example process performed, for example, by a user equipment, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs a threshold-based request for system information on demand.

As shown in FIG. 4, in some aspects, process 400 may include transmitting a request for system information based at least in part on a threshold (block 410). For example, the UE (e.g., using controller/processor 280, transmit processor 264, TX MIMO processor 266, MOD 254, antenna 252, and/or the like) may transmit or provide a request for system information. The UE may transmit the request for system information based at least in part on a threshold. For example, the UE may determine that the threshold is satisfied. In that case, the UE may transmit the request for system information based at least in part on the threshold being satisfied. In some aspects, the UE may transmit the request to a base station, such as a base station that provides a serving cell or primary cell of the UE or a base station for which the threshold was satisfied.

As shown in FIG. 4, in some aspects, process 400 may include receiving the system information based at least in part on the request (block 420). For example, the UE (e.g., using antenna 252, DEMOD 254, MIMO detector 256, receive processor 258, controller/processor 280, and/or the like) may receive the system information based at least in part on the request. In some aspects, the UE may receive the system information from a base station (e.g., BS 110) such as a base station that provides a serving cell of the UE and/or a base station to which the request was transmitted. In some aspects, the request may indicate which system information is to be transmitted by the base station. In some aspects, the UE may perform cell reselection based at least in part on the system information. For example, the UE may perform cell reselection from a cell provided by the base station to a target cell.

Process 400 may include additional aspects, such as any single aspect or any combination of aspects described below and/or in connection with one or more other processes described elsewhere herein.

In some aspects, the UE may perform a measurement, wherein transmitting the request is based at least in part on comparing result of the measurement with the threshold. In some aspects, the threshold is based on a measurement performed by the UE. In some aspects, the measurement is based at least in part on at least one of a reference signal received power, a reference signal received quality, or a signal to interference plus noise ratio.

In some aspects, the threshold is associated with a reporting event. In some aspects, the system information is for cell reselection. In some aspects, the UE may receive information from a base station identifying the threshold, wherein the request is transmitted to the base station. In some aspects, the threshold is for a serving cell of the UE. In some aspects, the UE may determine the threshold. In some aspects, the UE may determine that the threshold is satisfied. In some aspects, the threshold is different than a threshold for cell reselection. In some aspects, the request comprises a random access message or a connection request message (e.g., a MSG3 message). In some aspects, the request is transmitted based at least in part on initiating a random access procedure.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a diagram illustrating an example process 500 performed, for example, by a base station, in accordance with various aspects of the present disclosure. Example process 500 is an example where a base station (e.g., BS 110) performs a threshold-based request for system information on demand.

As shown in FIG. 5, in some aspects, process 500 may include receiving a request for system information, wherein the request is based at least in part on a threshold, wherein the threshold is determined or configured by the base station (block 510). For example, the base station (e.g., using antenna 234, DEMOD 232, MIMO detector 236, receive processor 238, controller/processor 240, and/or the like) may receive a request for system information. In some aspects, the request may be based at least in part on a threshold. The threshold may be determined or configured by the base station (e.g., may be cell-specific).

As shown in FIG. 5, in some aspects, process 500 may include transmitting the system information to a user equipment (UE) associated with the request based at least in part on the request (block 520). For example, the base station (e.g., using controller/processor 240, transmit processor 220, TX MIMO processor 230, MOD 232, antenna 234, and/or the like) may transmit (e.g., broadcast, unicast, etc.) the system information to a UE associated with the request (e.g., a UE that transmitted the request). In some aspects, the base station may provide system information for cell reselection. Additionally, or alternatively, the base station may determine which system information is to be transmitted based at least in part on the request (e.g., based at least in part on an implicit or explicit indication in the request).

Process 500 may include additional aspects, such as any single aspect or any combination of aspects described below and/or in connection with one or more other processes described elsewhere herein.

In some aspects, transmitting the system information further comprises broadcasting or unicasting the system information. In some aspects, the threshold is used in connection with requests for reselection-related system information. In some aspects, the threshold is associated with a reporting event.

In some aspects, the system information is for cell reselection. In some aspects, the base station may transmit, broadcast, or unicast information identifying the threshold. In some aspects, the base station provides a serving cell of the UE. In some aspects, the threshold is different than a threshold for cell reselection. In some aspects, the request comprises a random access message. In some aspects, the system information is particular information that is selected based at least in part on content of the request.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    transmitting a request for cell reselection-related system information based at least in part on a measurement performed by the UE satisfying a first threshold associated with requesting the cell reselection-related system information,
        wherein the first threshold is different than a second threshold for performing cell reselection; and
    receiving the cell reselection-related system information based at least in part on the request.
2. The method of claim 1, further comprising:
    performing the measurement, wherein transmitting the request is based at least in part on comparing result of the measurement with the first threshold.
3. The method of claim 2, wherein the measurement is based at least in part on at least one of a reference signal received power, a reference signal received quality, or a signal to interference plus noise ratio.
4. The method of claim 1, wherein the first threshold is associated with a reporting event.
5. The method of claim 1, further comprising:
    receiving information from a base station identifying the first threshold, wherein the request is transmitted to the base station.
6. The method of claim 1, wherein the first threshold is for a serving cell of the UE.
7. The method of claim 1, further comprising:
    determining the first threshold based on at least one of:
        a preconfigured value,
        a condition or parameter of the UE, or
        a mobility state of the UE.
8. The method of claim 1, further comprising:
    determining that the first threshold is satisfied.
9. The method of claim 1, wherein the request comprises a random access message or a connection request message.
10. The method of claim 1, wherein the request is transmitted based at least in part on initiating a random access procedure.
11. A method of wireless communication performed by a base station, comprising:
    receiving a request for cell reselection-related system information, wherein the request is based at least in part on a measurement performed by a user equipment (UE) satisfying a first threshold associated with requesting the cell reselection-related system information,
        wherein the first threshold is determined or configured by the base station, and
        wherein the first threshold is different than a second threshold for performing cell reselection; and
    transmitting the cell reselection-related system information to the UE based at least in part on the request.
12. The method of claim 11, wherein transmitting the cell reselection-related system information further comprises broadcasting or unicasting the cell reselection-related system information.
13. The method of claim 11, wherein the first threshold is associated with a reporting event.
14. The method of claim 11, further comprising:
    transmitting, broadcasting, or unicasting information identifying the first threshold.
15. The method of claim 11, wherein the base station provides a serving cell of the UE.
16. The method of claim 11, wherein the request comprises a random access message.
17. The method of claim 11, wherein the request is transmitted based at least in part on initiating a random access procedure.
18. The method of claim 11, wherein the cell reselection-related system information is selected for the UE based at least in part on a content of the request.
19. A user equipment (UE) for wireless communication, comprising:
    a memory; and
    one or more processors operatively coupled to the memory, the memory and the one or more processors configured to:
        transmit a request for cell reselection-related system information based at least in part on a measurement performed by the UE satisfying a first threshold associated with requesting the cell reselection-related system information,
            wherein the first threshold is different than a second threshold for performing cell reselection; and
        receive the cell reselection-related system information based at least in part on the request.
20. The UE of claim 19, wherein the one or more processors are further to:
    perform the measurement, wherein transmitting the request is based at least in part on comparing result of the measurement with the first threshold.
21. The UE of claim 19, wherein the one or more processors are further configured to:
    receive information from a base station identifying the first threshold, wherein the request is transmitted to the base station.
22. The UE of claim 19, wherein the one or more processors are further configured to:
    determine the first threshold based on at least one of:
        a preconfigured value,
        a condition or parameter of the UE, or
        a mobility state of the UE.
23. The UE of claim 19, wherein the measurement is based at least in part on at least one of a reference signal received power, a reference signal received quality, or a signal to interference plus noise ratio.
24. The UE of claim 19, wherein the first threshold is for a serving cell of the UE.
25. The UE of claim 19, wherein the one or more processors are further to:
    determine that the first threshold is satisfied.
26. A base station for wireless communication, comprising:
    a memory; and one or more processors operatively coupled to the memory, the memory and the one or more processors configured to:
receive a request for cell reselection-related system information, wherein the request is based at least in part on a measurement performed by a user equipment (UE) satisfying a first threshold,
wherein the first threshold is determined or configured by the base station, and
wherein the first threshold is different than a second threshold for performing cell reselection; and
transmit the cell reselection-related system information to the UE based at least in part on the request.

27. The base station of claim 26, wherein the one or more processors are further configured to:
transmit or broadcast information identifying the first threshold.

28. The base station of claim 26, wherein the base station provides a serving cell of the UE.

29. The base station of claim 26, wherein the one or more processors, when transmitting the cell reselection-related system information, are configured to:
broadcast or unicast the cell reselection-related system information.

30. The base station of claim 26, wherein the request comprises a random access message.

* * * * *